(12) United States Patent
Zhao et al.

(10) Patent No.: US 8,576,768 B2
(45) Date of Patent: Nov. 5, 2013

(54) HYBRID MULTI-BAND RECEIVER

(75) Inventors: Liang Zhao, Sunnyvale, CA (US);
Roger Brockenbrough, Los Gatos, CA (US); Michael Kohlmann, San Francisco, CA (US); Cormac S. Conroy, Campbell, CA (US); Anup Savla, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/425,285

(22) Filed: Apr. 16, 2009

(65) Prior Publication Data
US 2010/0265875 A1 Oct. 21, 2010

(51) Int. Cl.
*H04B 7/185* (2006.01)
*H04B 1/40* (2006.01)

(52) U.S. Cl.
USPC .......................................... 370/316; 455/86

(58) Field of Classification Search
USPC ....................................................... 370/316
See application file for complete search history.

(56) References Cited

U.S. PATENT DOCUMENTS

| | | | |
|---|---|---|---|
| 5,099,243 A * | 3/1992 | Tsui et al. | 324/76.47 |
| 6,208,290 B1 | 3/2001 | Krasner | |
| 6,917,815 B2 | 7/2005 | Hajimiri et al. | |
| 6,922,555 B1 * | 7/2005 | Mohindra | 455/314 |
| 6,963,734 B2 * | 11/2005 | Sorrells et al. | 455/296 |
| 7,327,994 B2 | 2/2008 | Rafati | |
| 7,446,704 B2 * | 11/2008 | Kiukkonen | 342/357.68 |
| 7,639,171 B2 * | 12/2009 | Alland et al. | 342/25 R |
| 7,859,459 B2 * | 12/2010 | McCune, Jr. | 342/372 |
| 8,022,868 B2 * | 9/2011 | Yudanov et al. | 342/357.62 |
| 8,022,872 B2 * | 9/2011 | Katayama et al. | 342/357.77 |
| 8,208,881 B2 * | 6/2012 | Wu | 455/196.1 |
| 2002/0065060 A1 * | 5/2002 | Minnis et al. | 455/324 |
| 2003/0186660 A1 * | 10/2003 | Lee | 455/140 |
| 2005/0162307 A1 * | 7/2005 | Kato | 342/357.06 |
| 2006/0058001 A1 * | 3/2006 | Minnis et al. | 455/334 |
| 2006/0240766 A1 * | 10/2006 | Wilde | 455/3.01 |
| 2006/0244656 A1 * | 11/2006 | Lawrence et al. | 342/357.02 |
| 2006/0281432 A1 * | 12/2006 | Isaac et al. | 455/323 |
| 2007/0021081 A1 | 1/2007 | Passoke | |
| 2007/0096980 A1 | 5/2007 | Gradincic et al. | |
| 2007/0189236 A1 * | 8/2007 | Ranta-aho et al. | 370/335 |
| 2007/0258402 A1 * | 11/2007 | Nakamata et al. | 370/329 |
| 2007/0259643 A1 * | 11/2007 | Wu | 455/315 |
| 2008/0130548 A1 * | 6/2008 | Kaikkonen et al. | 370/312 |

(Continued)

FOREIGN PATENT DOCUMENTS

EP 1154589 A2 11/2001
EP 1300956 A1 4/2003

(Continued)

OTHER PUBLICATIONS

International Search Report and Written Opinion—PCT/US2010/031464, International Search Authority—European Patent Office—Aug. 2, 2010.

*Primary Examiner* — Guang Li

(57) ABSTRACT

The subject matter disclosed herein relates to a system and method for processing wireless signals received from one or more communications systems. In a particular implementation, one or more signals received from one or more communication systems such as a GNSS may be processed in two or more separate wireless signal receiver paths and combined in baseband to share one analog-to-digital converter.

38 Claims, 12 Drawing Sheets

(56) References Cited

U.S. PATENT DOCUMENTS

2008/0188220 A1* 8/2008 DiGirolamo et al. ......... 455/434
2009/0011704 A1* 1/2009 Karabinis .................... 455/13.4
2009/0081974 A1* 3/2009 Wu ............................ 455/127.4
2009/0160704 A1   6/2009 Zhao

FOREIGN PATENT DOCUMENTS

| EP | 1473844 | 11/2004 |
| EP | 1460714 B1 * | 5/2006 |
| EP | 1764926 | 3/2007 |
| WO | WO0011800 A1 | 3/2000 |

* cited by examiner

HYBRID MULTI-BAND RECEIVER

BACKGROUND

1. Field

The subject matter disclosed herein relates to receiving wireless signals transmitted from one or more communication systems such as, for example, one or more global navigation satellite systems.

2. Information

A satellite positioning system (SPS) may comprise a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation, (e.g., using different PN codes for each satellite as in GPS or using the same code on different frequencies as in Glonass). To estimate a location at a receiver, a navigation system may determine pseudorange measurements to satellites "in view" of the receiver using well known techniques based, at least in part, on detections of PN codes in signals received from the satellites FIG. 1 illustrates an application of an SPS system, whereby a mobile station (MS) 100 in a wireless communications system receives transmissions from satellites 102a, 102b, 102c, 102d in the line of sight to MS 100, and derives time measurements from four or more of the transmissions. MS 100 may provide such measurements to position determination entity (PDE) 104, which determines the position of the station from the measurements. Alternatively, the subscriber station 100 may determine its own position from this information.

Wireless communications system receivers or position location system receivers, such as, for example, mobile station 100 described above, may include multiple antennae or signals at several frequencies in some circumstances in an effort to improve performance. Signals received at different antennae or signals at different frequencies may undergo different paths and may therefore be unlikely to experience similar fading of other unfavorable conditions, for example. However, incorporating multiple antennae or signals at different frequencies into communications receivers may result in additional circuitry required to implement multiple receiver channels leading to increased costs and power consumption, for example.

SUMMARY

In one aspect, two or more wireless signals may be received at a receiver at two or more receiver paths. In another aspect, the two or more received wireless signals may be downconverted using two or more separate complex mixers in the two or more receiver paths to generate two or more intermediate frequency signals. The down-conversion may be based, at least in part, on two or more oscillating signals having separately selectable frequencies provided by one or more local oscillators. In a further aspect, the two or more intermediate frequency signals may be combined to generate a combined signal comprising an in-phase component and a quadrature component, and the combined signal may be converted to a digital signal comprising in-phase and quadrature components.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

As discussed above, wireless receiver performance may be enhanced by receiving signals at different frequencies, or signals through multiple antennas that are physically separated. These different signals may undergo different wireless channel conditions. Combining the signals from the different paths may significantly improve signal quality in such circumstances. Further, combining signals from different paths may aid in reducing thermal noise, in at least some circumstances.

In another aspect, multiple signals centered at different frequencies may help combat ionosphere and troposphere effects, for example. A path, including an antenna that is enabled all of the time may be referred to as a primary path, and a path that may be selectively turned off and on may be referred to as a secondary path.

Figure 1:
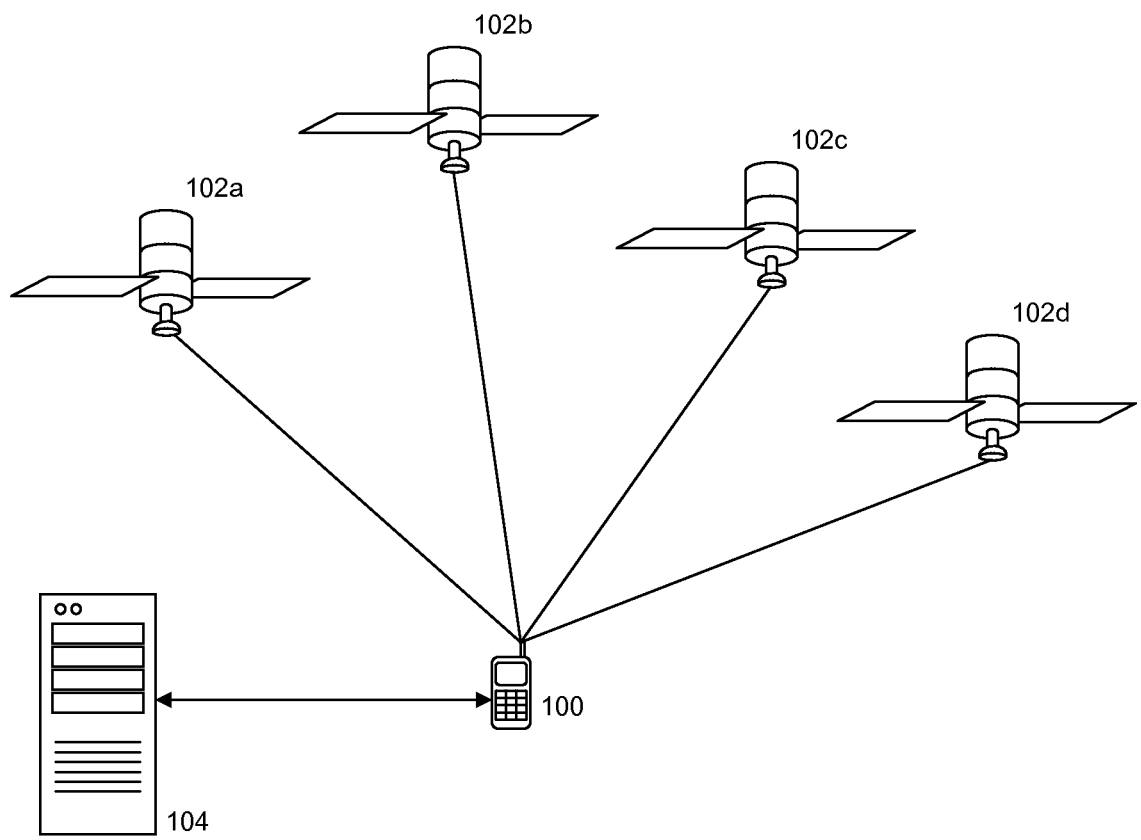
FIG. 1 is a block diagram of an example satellite position system (SPS) including a mobile station.
Figure 2:
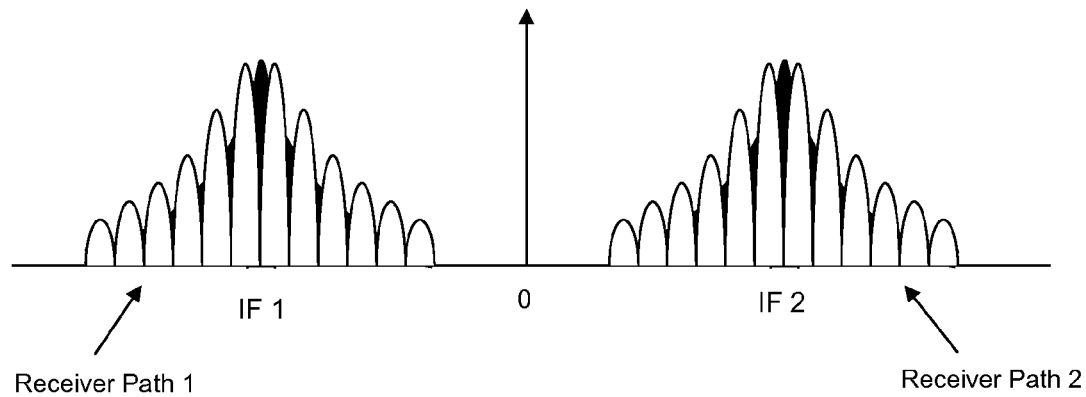
FIG. 2 is an illustration of two example wireless signals processed by two receiver paths in a mobile station.

FIG. 2 shows spectra associated with two wireless signals 201 and 203 that may be received, in an aspect, at two separate antennae associated with two separate receiver paths in a mobile station, such as, for example, mobile station 100 depicted in FIG. 1. The spectra of FIG. 2 depict the wireless signals following separate downconversion processes, explained more fully below. For this example, SPS signals 201 and 203 represent a single signal transmitted by a GNSS and received at two spatially separate antennae. The downconverted signals 201 and 203, which may be referred to as intermediate frequency (IF) signals IF 1 and IF 2, respectively, may be combined to form a combined signal which may in turn be filtered and converted to a digital signal. The filtering and converting after combining the IF signals may be accomplished by a single path within the receiver, thus eliminating the need for separate filter and conversion paths for each antenna. Savings in power consumption and silicon die area may result, in one or more aspects. Pseudorange measurements obtained from SPS signals 201 and 203 may be used to determine a location of the receiver using techniques known to those of ordinary skill in the art, for example. Of course, although examples described herein discuss SPS signals, other example implementations in accordance with claimed subject matter may receive and process wireless signals from other types of wireless communication systems, such as wireless cellular telecommunications systems, to name merely one example.

Figure 3:
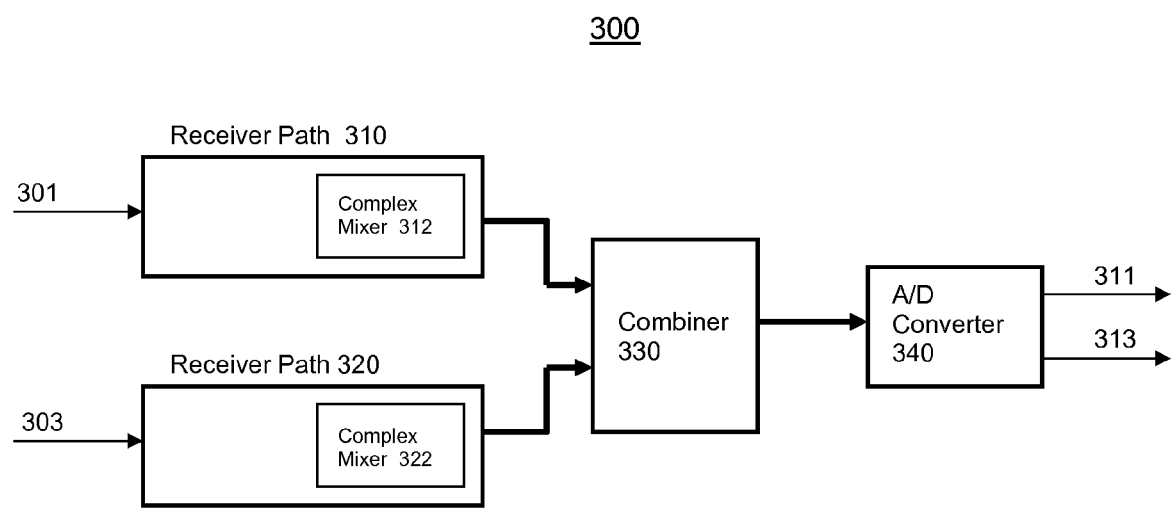
FIG. 3 is a schematic block diagram of an example mobile station receiver.

FIG. 3 is a schematic block diagram of an example receiver that may be employed in a mobile station, such as mobile station 100. Wireless signals 301 and 303 may be received at two separate antennae (not shown). Receiver 300 may comprise two separate receiver paths 310 and 320. In an aspect, receiver paths 310 and 320 may comprise separate complex mixers 312 and 322, respectively. The operation of complex mixers 312 and 322 are discussed more fully below. In one aspect, complex mixers 312 and 322 may receive separate oscillating signals having individually selectable frequencies. In another aspect, receiver paths 310 and 320 may comprise separate baseband filters, as described more fully below.

Receiver paths 310 and 320 may produce a pair of intermediate frequency complex signals to be combined in a combiner 330 to produce a combined signal. The combined signal may then be processed in a number of ways by a single receiver channel, represented in this example by an analog-to-digital converter 340. Analog-to-digital converter 340 may generate a complex digital signal with in-phase and quadrature components 311 and 313, respectively, for this example. In another aspect, and as will be discussed below in connection with FIGS. 4 and 5, the combined complex signal transmitted from combiner 330 may be filtered prior to the A/D conversion. Further, as mentioned above, receiver paths 310 and 320 may also comprise filtering circuitry. Thus, for one or more example receivers, baseband filtering may occur prior to the two signals being combined and may also occur after the signals are combined and prior to A/D conversion. Also, as used herein, the term "receiver path" is meant to include any circuitry and/or functional units that may receive and/or process a signal received at an antenna, where the processing occurs prior to combining the signal with one or more signals received at other antennae.

Although examples described herein disclose two antennae and two receiver paths, other examples may utilize more than two antennae and receiver paths. Other examples may also use one multi-band antenna to receive signals at different frequencies and may process these signals in different receiver paths. Further, although examples described herein are centered around SPS receivers, the scope of claimed subject matter is not limited in this respect, and the various aspects disclosed herein may be generalized for use in non-SPS receivers.

Figure 4:
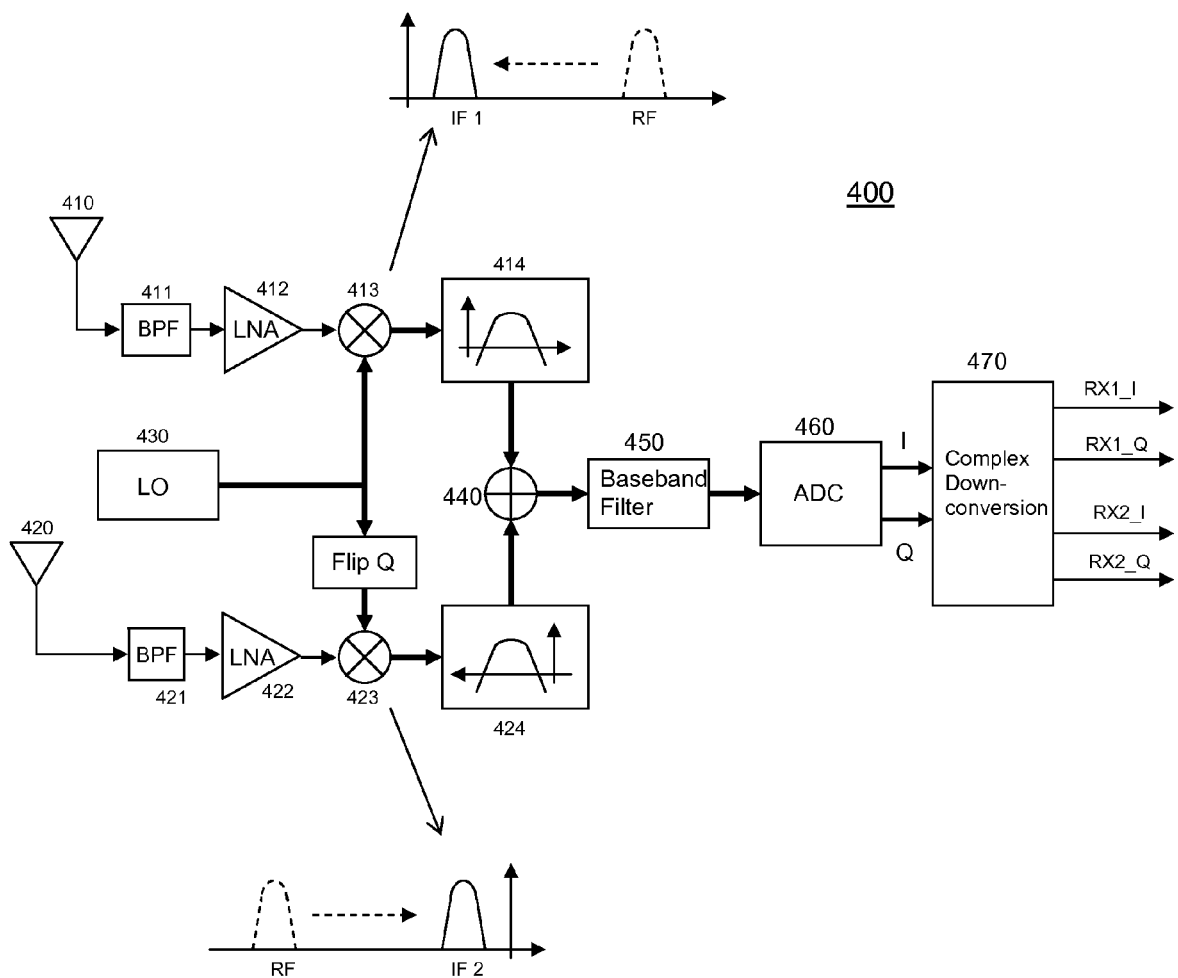
FIG. 4 is a schematic block diagram of an example mobile station receiver.

FIG. 4 is a schematic block diagram of an example mobile station receiver circuit 400. For the present example, antenna 410 and antenna 420 are included. Antenna 410 in an aspect may be associated with a receiver path including a Band Pass Filter (BPF) 411, a low noise amplifier (LNA) 412, a complex mixer 413, and a complex filter 414. Antenna 420 in another aspect may be associated with a separate receiver channel including bandpass filter 421, LNA 422, complex mixer 423, and complex filter 424. In one aspect, antennae 410 and 420 may comprise any antennae capable of receiving radio frequency signals.

In an aspect, complex mixers 413 and 423 may be provided with an oscillating signal from local oscillator (LO) 430. Mixer 423 may be provided a signal that is 180° out of phase with the signal provided to mixer 413. In this manner, a single oscillator may be used for both complex mixers. This configuration may be advantageous where a single wireless signal is received by spatially separated antennae 410 and 420.

As depicted in FIG. 4, complex mixer 413 may receive a relatively high frequency real signal from LNA 412 and may utilize the signal provided by LO 430 to downconvert the signal from LNA 412 to a relatively low frequency complex signal that may be provided to complex filter 414. The relatively low frequency complex signal generated by complex mixer 413 may be referred to as an intermediate frequency (IF) signal comprising in-phase and quadrature components. Similarly, complex mixer 423 may utilize the signal provided by LO 430 to downconvert the relatively high frequency real signal received from LNA 422 to a −IF complex signal that may be provided to complex filter 424. Downconverted signals IF and −IF may comprise additional high frequency components that may be removed by a low-pass filter, in one aspect.

As used herein, a "downconversion" may relate to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to an intermediate frequency (IF) signal, or transformation of an IF signal to a baseband signal and/or baseband information. However, these are merely examples of a downconversion and claimed subject matter is not limited in this respect.

LNA 412 and LNA 422 may aid in attenuating thermal noise levels. Additionally, filters 414 and 424 may filter the IF and −IF signals prior to combining the signals at combiner 440 in order to limit out-of-band thermal noise. In various aspects, any of a wide range of complex filter types may be utilized. In an aspect, complex filters 414 and 424 may comprise any circuitry capable of selecting signals at some specified range of frequencies and further capable of attenuating signals at other frequencies. For an example, the LNA 412 and 422 selectivity and the pre-combiner complex filters 414 and 424 may provide approximately −20 dB combined attenuation.

Combiner 440 for the current example may receive filtered signals from complex filters 414 and 424, and may combine the two complex signals into a single complex signal. In an aspect, combiner 440 may combine the two signals at equal gain, although the scope of claimed subject matter is not limited in this respect. By combining the two complex signals into a single complex signal, a single receiver path may be used to perform further filtering and/or A/D conversion. Some of the advantages of utilizing the single receiver path may include, but are not limited to, power savings and die space savings, which may lead to reduced costs as well as improved performance.

Figure 6:
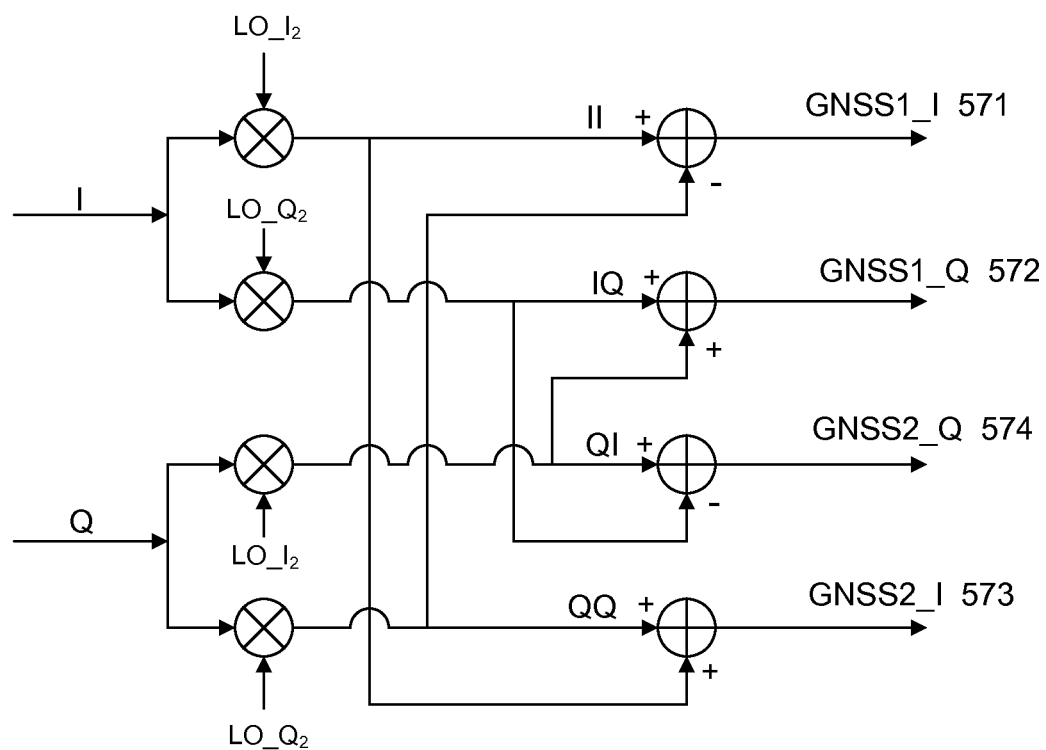
FIG. 6 is an illustration depicting an example complex downconverter.

In another aspect, combiner 440 may transmit the combined signal to a baseband filter 450, although other example implementations in accordance with claimed subject matter may not include filter 450. Analog-to-digital converter 460 may generate a complex digital signal comprising in-phase and quadrature components, and a complex downconversion unit 470 may separate the combined digital signal into separate complex signals that may be utilized by baseband processors to perform navigation operations, to name merely one example application. FIG. 6 and the accompanying disclosure below illustrate an example downconversion process, according to one example aspect.

Figure 5:
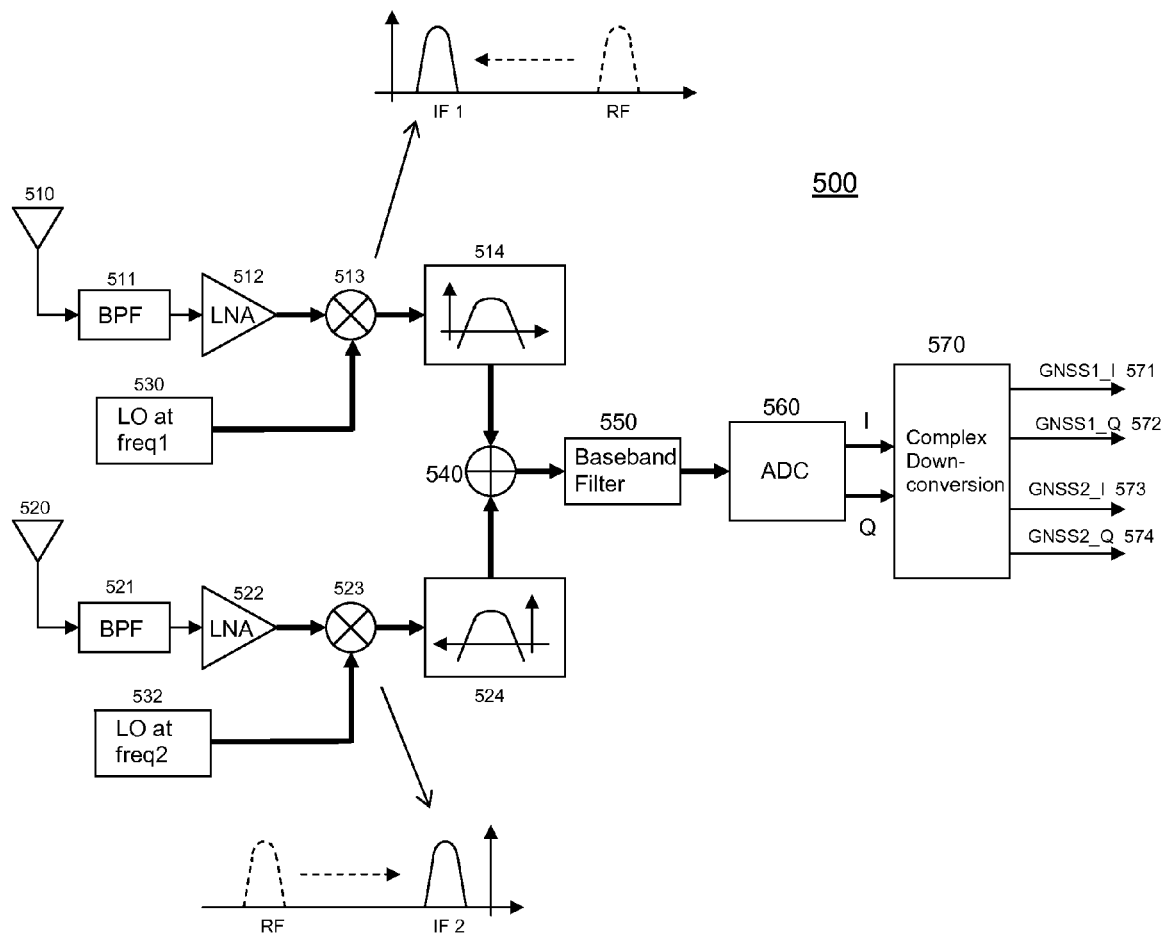
FIG. 5 is a schematic block diagram of an example mobile station receiver.

FIG. 5 is a schematic block diagram of an example mobile station receiver 500. Receiver circuit 500 is similar in some respects to the example described above in connection with FIG. 4. For example, receiver 500 may receive a first wireless signal from antenna 510 at a receiver path comprising a BPF 511, an LNA 512, a complex mixer 513, and a complex filter 514. Similarly, receiver 500 may comprise an optional antenna 520 and a separate receiver path comprising a BPF 521, an LNA 522, a complex filter 523, and a complex filter 524. However, for the present example of receiver 500, rather than utilizing a single local oscillator to provide periodic signals for both complex mixers 513 and 523, two separate local oscillators 530 and 532 are utilized for the separate complex mixers 513 and 523, respectively. This may provide more flexibility in receiving and processing wireless signals.

In one aspect, receiver 500 may include both antennae 510 and 520, and may receive a single SPS signal transmitted by a GNSS at each of the antennae 510 and 520. In this spatial diversity situation, freq1 and freq2 generated by oscillators 530 and 532, respectively, may be approximately equal in frequency. This results in an example implementation similar to that discussed above in connection with FIG. 4.

In another aspect, receiver 500 may include antennae 510 and 520, and the two antennae may receive separate signals at different frequencies. For this example, the signals received at antennae 510 and 520 may be transmitted by a single GNSS, although the scope of claimed subject matter is not limited in this respect, and in other examples the separate signals may be transmitted by more than a single communications system.

In a further aspect, receiver 500 may include a single multi-band antennae that may receive multiple signals at different frequencies. For example, if antenna 510 comprises a multi-band antennae, it may supply bandpass filter 511 with one of the received signals and may provide the other received signal to bandpass filter 521. For this example, whether one antenna or two antennae are utilized to receive the two signals at different frequencies, complex mixers 513 and 523 may receive oscillating signals from local oscillators 530 and 532, respectfully, and the two oscillating signals may have different frequencies to accommodate the down-conversion of the received signals.

In an aspect, the oscillating signals provided to complex mixers 513 and 523 may have individually selectable frequencies in order to accommodate a wide range of wireless signals. The frequencies may be selected during the design of the receiver, or may be selected during the manufacturing stage, or may be selectable in the field, to list a few examples. For one example, a configuration register (not shown) may be programmed with appropriate values to select desired frequencies for the local oscillators. Of course, these are merely examples of how the frequencies of the oscillating signals for complex mixers 513 and 523 may be selected, and the scope of claimed subject matter is not limited in these respects. Further, although the example of FIG. 5 depicts two separate local oscillators 530 and 532, other example implementations in accordance with claimed subject matter may utilize a single oscillator capable of generating multiple oscillating signals at different frequencies. In other examples, more than two local oscillators may be utilized, although the scope of claimed subject matter is not limited in this respect.

As with receiver 400, receiver 500 for this example also includes a single receiver channel including a bandpass filter/baseband amplifier 550, an analog-to-digital converter 560, and a complex downconverter unit 570. Complex downconverter unit 570 is described more fully below in connection with FIG. 6.

Although examples described herein utilize filters 514 and 524 to condition the intermediate frequency signals produced by complex mixers 513 and 523 prior to the combining operation, other examples in accordance with claimed subject matter may not include such filters. Also, other examples in accordance with claimed subject matter may not include baseband filter 550.

FIG. 6 is an illustration depicting an example complex downconverter. The downconverter example of FIG. 6 may comprise downconversion unit 570 depicted in FIG. 5, although the operations described in the present example may also apply to downconversion unit 470 depicted in FIG. 4. FIG. 6 shows a complex downconversion according to one particular implementation of complex downconversion unit 570 in which complex downconversion is performed for signals from two GNSS' (e.g., n=2 for $GNSS_1$ and $GNSS_2$) received at antennae 510 and 520, respectively, processed by the two separate receiver paths and combined by combiner 540, filtered by BPF/BBA 550 and subsequently converted into a complex digital combined signal by ADC 560. In-phase (I) and quadrature (Q) samples are mixed and combined as shown to provide output samples for processing according to $GNSS_1$ ($GNSS_1\_I$ and $GNSS_1\_Q$) and output samples for processing according to $GNSS_2$ ($GNSS_2\_I$ and $GNSS_2\_Q$). Here, local oscillator frequencies for $LO\_I_1$, $LO\_Q_1$, $LO\_I_2$ and $LO\_Q_2$ for particular GNSS' may depend on particular signed offsets of sub band center frequencies, and intermediate frequencies resulting from mixing with LOs at the earlier RF to IF downconversion stages at complex mixers 513 and 523.

In this particular implementation, mixer output signals II, IQ, QI, and QQ are combined by addition and/or subtraction to provide particular output samples GNSS1_I 571, GNSS1_Q 572, GNSS2_I 573, and GNSS2_Q 574, according to a particular choice of system parameters such as, for example, a local oscillator frequency. It should be understood, however, that mixer output signals may be combined differently in other implementations and that claimed subject matter is not limited in this respect.

In a particular implementation illustrated in FIG. 6 where local oscillators for GNSS₁ and GNSS₂ are very close or the same, frequencies for $LO\_I_1$, $LO\_Q_1$, $LO\_I_2$ and $LO\_Q_2$ may be the same. As such, the particular implementation of a complex downconversion circuit shown in FIG. 6 may be adapted to downconvert first and second intermediate frequency (IF) signals to associated first and second baseband signals. Here, only four multipliers are used to combine the first and second IF signals with a local oscillator to provide an associated four multiplier output signals. A first pair of adders provides the first baseband signal based, at least in part, on the four multiplier output signals. A second pair of adders provides the second baseband signal based, at least in part, on the four multiplier output signals. As pointed out above, output samples provided by complex downconversion unit 570 may be baseband processed according to specific GNSS signal processing requirements to, for example, determine pseudo-range measurements to assist in determining a location of a receiver.

In more detail, the complex downconversion process depicted in FIG. 6 may comprise mixing the in-phase component of the digital signal from ADC 560 with an in-phase component of a signal from a local oscillator and with a quadrature component of the signal from the local oscillator to produce signals II and IQ, depicted in FIG. 6. Likewise, this process may also comprise mixing the quadrature component of the digital signal with the in-phase component of the signal from the local oscillator and with the quadrature component of the signal from the local oscillator to produce signals QI and QQ, also depicted in FIG. 6. The complex downconversion may further comprise combining the II, IQ, QI, and QQ signals by addition and/or subtraction to provide particular output samples GNSS1_I 571, GNSS1_Q 572, GNSS2_I 573, and GNSS2_Q 574.

Figure 7A:
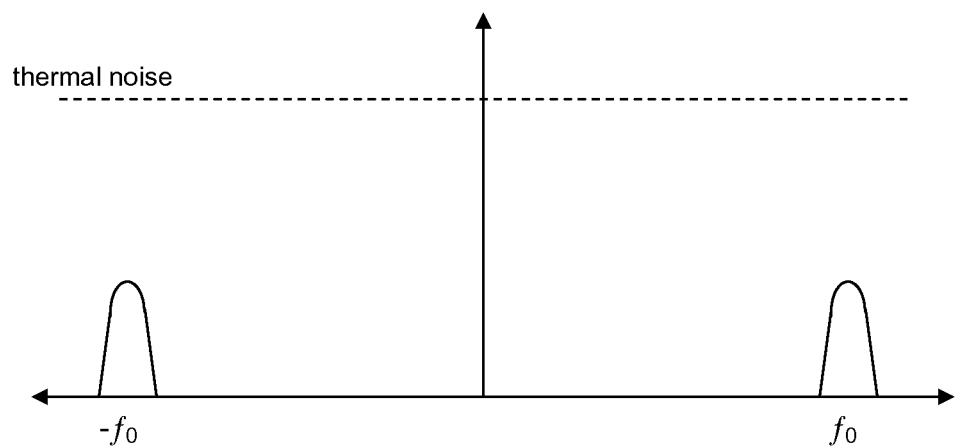
FIG. 7a is an illustration depicting an example SPS signal received at two separate antennae.
Figure 7B:
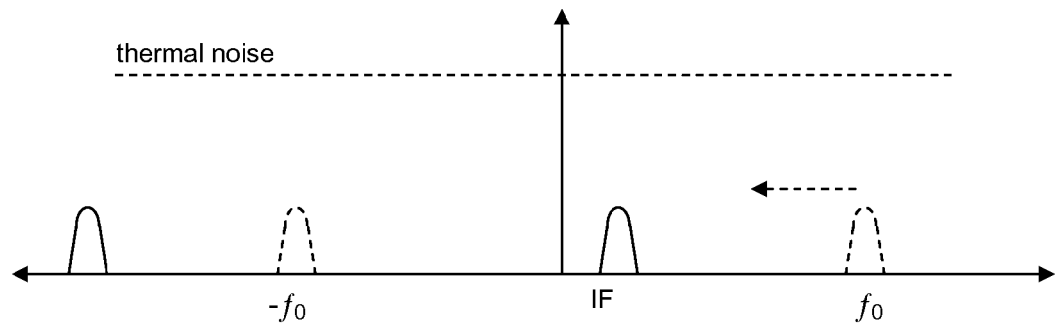
FIG. 7b is an illustration depicting an example output waveform from a complex mixer of an example receiver path.
Figure 7C:
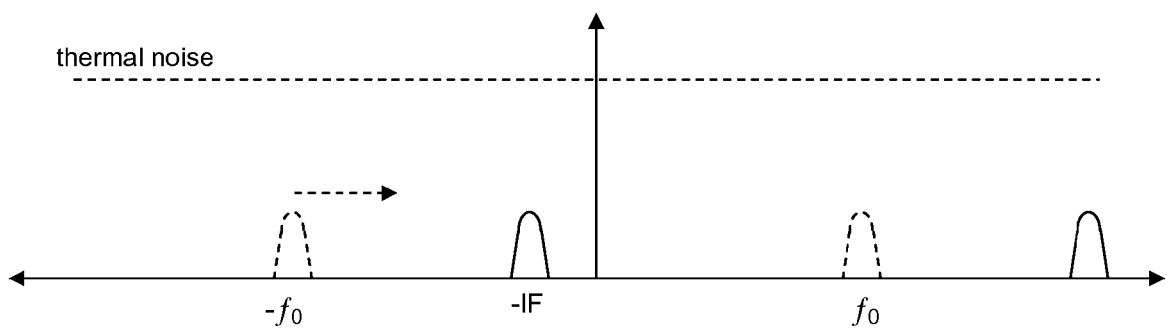
FIG. 7c is an illustration depicting an example output waveform from a second separate complex mixer of a second separate receiver path.

FIGS. 7a-7g illustrate a signal spectrum as viewed at various locations in receiver 400. The plot of FIG. 7a represents the RF spectrum at the inputs of LNA 412 and 422 for an SPS signal received at antennae 410 and 420. FIG. 7b illustrates a signal spectrum of the complex signal at the output of complex mixer 413, and FIG. 7c illustrates a spectrum of the complex signal at the output of complex mixer 423. It may be noted that for this example, thermal noise is flat, and summing the two signals directly would increase thermal noise by 3 dB. For this reason, complex filters 414 and 424 may be utilized to suppress noise around the image frequency. Of course, as mentioned previously, some example implementations may not utilize filters 414 and 424, although performance may be negatively affected due to the thermal noise issue mentioned above.

Figure 7D:
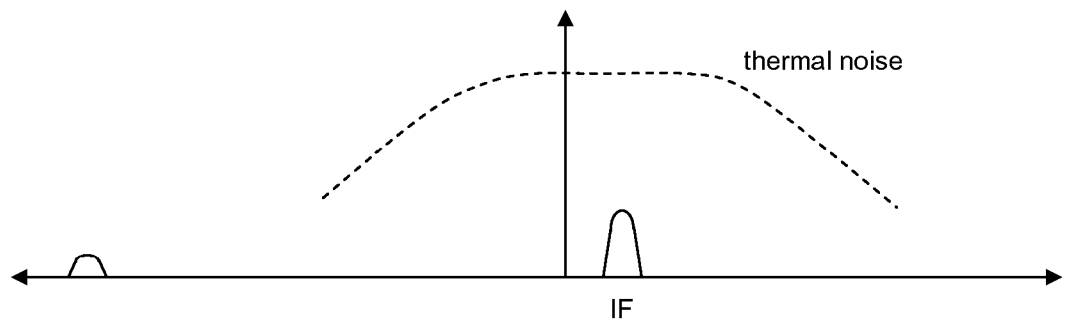
FIG. 7d is an illustration depicting an example output waveform from a baseband filter of an example receiver path.
Figure 7E:
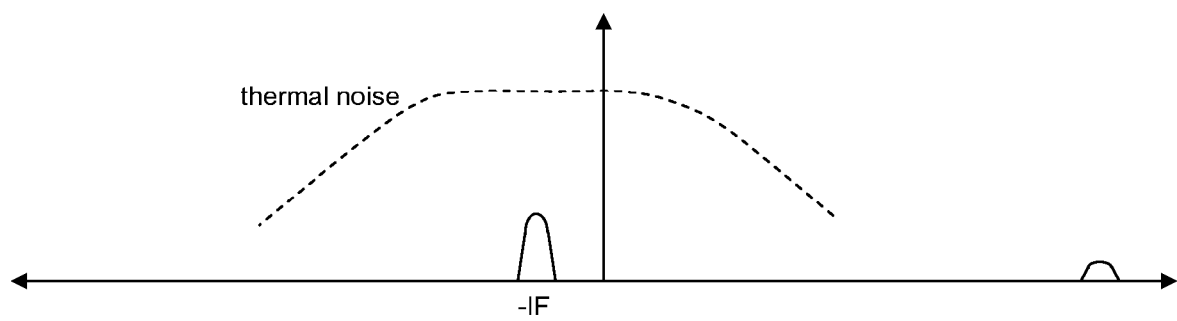
FIG. 7e is an illustration depicting an example output waveform from a second baseband filter of a second separate receiver path.
Figure 7F:
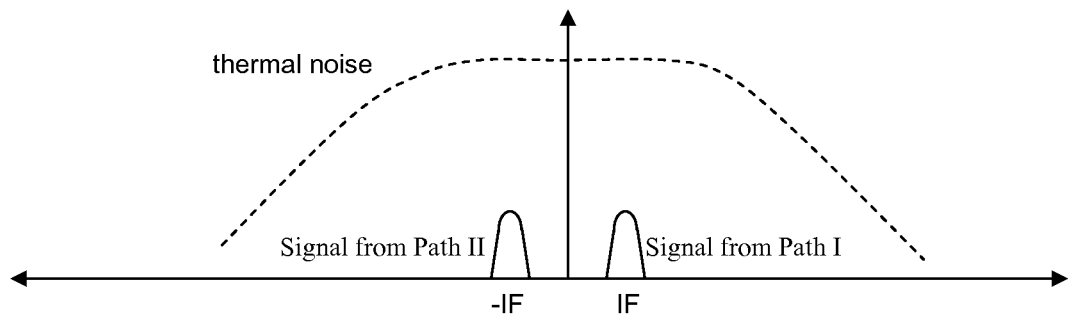
FIG. 7f is an illustration depicting an example output waveform from an example combiner.
Figure 7G:
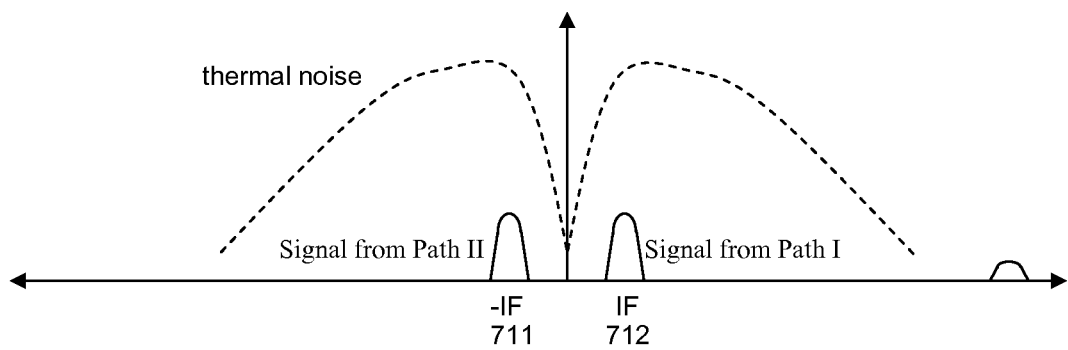
FIG. 7g is an illustration depicting an example waveform provided to an input of an analog-to-digital converter from an example combined signal baseband filter.

FIG. 7d depicts the signal spectrum at the output of complex filter 414, and FIG. 7e illustrates the spectrum at the output of complex filter 424. FIG. 7f depicts the spectrum at the output of combiner 440 which sums the two complex intermediate frequency signals to produce a combined signal. FIG. 7g illustrates the signal spectrum at the input to ADC 460. The waveform of FIG. 7g may reflect filtering by DC notch filters and/or other filters that may help make up the shared receiver channel.

Figure 8:
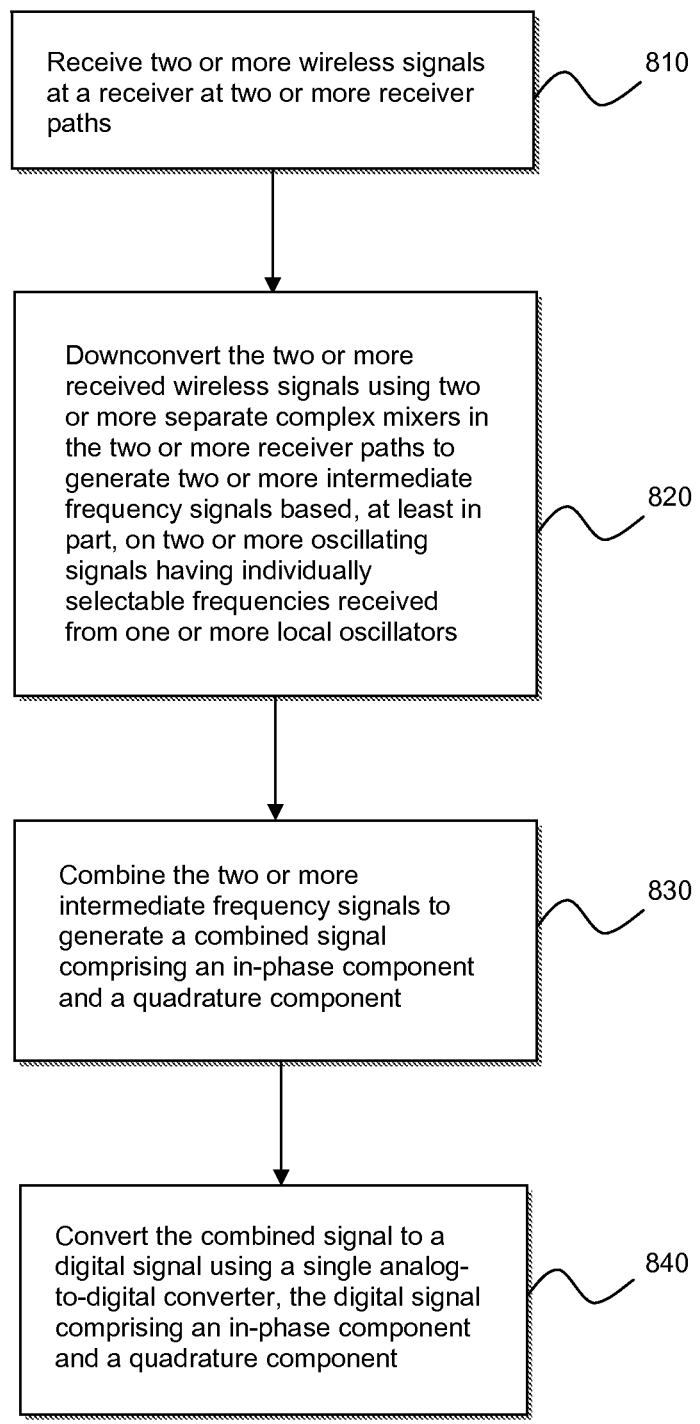
FIG. 8 is a flow diagram of an example embodiment of a method for processing two or more wireless signals at a receiver with two or more receiver paths.

FIG. 8 is a flow diagram of an example embodiment of a method for receiving two or more wireless signals at a receiver with two or more receiver paths. At block 810, two or more wireless signals may be received at the receiver at the two or more receiver paths. The two or more received wireless signals may be downconverted at block 820 using two or more separate complex mixers in the two or more receiver paths to generate two or more intermediate frequency signals. In an aspect, the downconversion of the two or more received signals may be based, at least in part, on two or more oscillating signals having individually selectable frequencies. The two or more oscillating signals may be received from one or more local oscillators. The two or more intermediate frequency signals may then be combined at block 830 to generate a combined signal comprising an in-phase component and a quadrature component. The combined signal may be converted into a digital signal using an analog-to-digital converter at block 840. The digital signal may comprise an in-phase component and a quadrature component, in this example. Various examples may include fewer than, all of, or more than blocks 810-840. Furthermore, the order of blocks 810-840 is merely an example order, and the scope of claimed subject matter is not limited in this respect.

In another aspect, the combined signal may be filtered by a combined baseband filter prior to the analog-to-digital conversion process, as discussed previously. In a further aspect, the complex digital signal may be separated into two or more complex signals comprising in-phase and quadrature components using a complex downconversion process, as also discussed previously.

Figure 9:
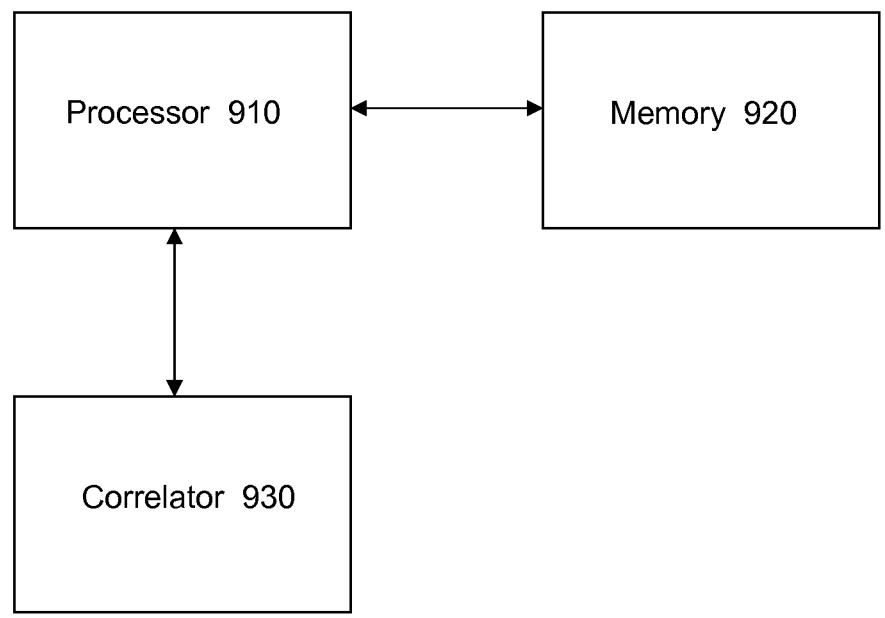
FIG. 9 is a schematic diagram of a system for processing signals to determine a position location according to one aspect.

FIG. 9 illustrates a system for acquiring periodically repeating signals from space vehicles (SV) according to one example. However, this is merely an implementation of a system that is capable of acquiring such signals according to a particular example and other systems may be used without deviating from claimed subject matter. As illustrated in FIG. 9 according to a particular implementation, such a system may comprise a computing platform including a processor 910, memory 920, and correlator 930. Correlator 930 may be adapted to produce correlation functions from signals provided by a receiver (not shown) to be processed by processor 910, either directly or through memory 920. Correlator 930 may be implemented in hardware, software, or a combination of hardware and software. However, these are merely examples of how a correlator may be implemented according to particular aspects and claimed subject matter is not limited in these respects.

According to an example, memory 920 may store machine-readable instructions which are accessible and executable by processor 910 to provide at least a portion of a computing platform. In a particular example, although claimed subject matter is not limited in these respects, processor 910 may direct correlator 930 to search for position determination signals as illustrated above and derive measurements from correlation functions generated by correlator 930.

Figure 10:
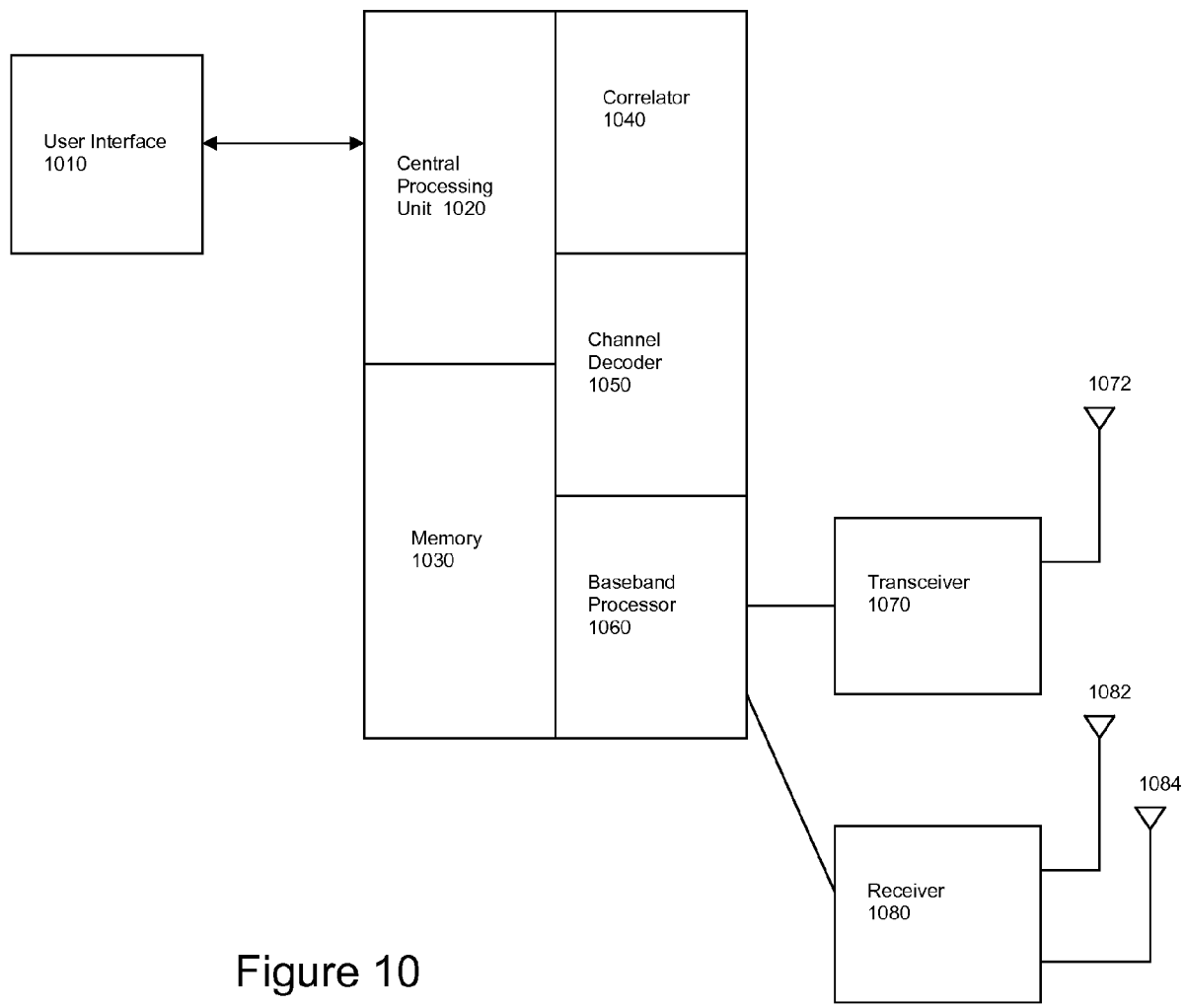
FIG. 10 is a schematic diagram of a mobile station according to one aspect.

FIG. 10 depicts an example mobile station 1000 incorporating multiple antenna and further incorporating receiver circuitry as described in the examples above. Implementations of a receiver as described herein may be incorporated in any one of several devices such as, for example, a mobile station, base station and/or car navigation systems. Such a mobile station may comprise any of several devices such as, for example, a mobile phone, notebook computer, personal digital assistant, personal navigation device and/or the like. Here, FIG. 10 shows a particular implementation of a mobile station in which radio transceiver 1070 may be adapted to modulate an RF carrier signal with baseband information, such as voice or data, onto an RF carrier, and demodulate a modulated RF carrier to obtain such baseband information. An antenna 1072 may be adapted to transmit a modulated RF carrier over a wireless communications link and receive a modulated RF carrier over a wireless communications link.

Baseband processor 1060 may be adapted to provide baseband information from CPU 1020 to transceiver 1070 for transmission over a wireless communications link. Here, CPU 1020 may obtain such baseband information from an input device within user interface 1010. Baseband processor 1060 may also be adapted to provide baseband information from transceiver 1070 to CPU 1020 for transmission through an output device within user interface 1010. User interface 1010 may comprise a plurality of devices for inputting or outputting user information such as voice or data. Such devices may include, for example, a keyboard, a display screen, a microphone, and a speaker.

SPS receiver (SPS Rx) 1080 may be adapted to receive and demodulate transmissions from SVs through SPS antennae 1082 and 1084, and provide demodulated information to correlator 1040. Correlator 1040 may be adapted to derive correlation functions from the information provided by receiver 1080. For a given PN code, for example, correlator 1040 may produce a correlation function defined over a range of code phases to set out a code phase search window, and over a range of Doppler frequency hypotheses as illustrated above. As such, an individual correlation may be performed in accordance with defined coherent and non-coherent integration parameters.

In an aspect, receiver 1080 may comprise a receiver similar to those described above in connection with FIGS. 3-5. Such receivers may comprise a GNSS receiver architecture where it is proposed to downconvert the complex signals in a primary path to a first intermediate frequency and the complex signals in a secondary path to a second intermediate frequency. In this way, the complex signals in the two paths can be combined into one complex signal, which will enable sharing the same baseband filter and analog-to-digital converter. The two GNSS signals can be separated in baseband processors by a complex down-conversion.

Correlator 1040 may also be adapted to derived pilot-related correlation functions from information relating to pilot signals provided by transceiver 1070. This information may be used by a subscriber station to acquire wireless communications services.

Channel decoder 1050 may be adapted to decode channel symbols received from baseband processor 1060 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1050 may comprise a turbo decoder.

Memory 1030 may be adapted to store machine-readable instructions which are executable to perform one or more of processes, examples, implementations, or examples thereof which have been described or suggested. CPU 1020 may be adapted to access and execute such machine-readable instructions. Through execution of these machine-readable instructions, CPU 1020 may direct correlator 1040 to analyze the SPS correlation functions provided by correlator 1040, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1020 at a mobile station may estimate a location the mobile station based, at least in part, on signals received from SVs as illustrated above. CPU 1020 may also be adapted to determine a code search range for acquiring a second received signal based, at least in part, on a code phase detected in a first received signal as illustrated above according to particular examples. It should be understood, however, that these are merely examples of systems for estimating a location based, at least in part, on pseudorange measurements, determining quantitative assessments of such pseudorange measurements, and terminating a process to improve accuracy of pseudorange measurements according to particular aspects, and that claimed subject matter is not limited in these respects.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Techniques described herein may be used with any one or more of several SPS, including the aforementioned SPS, for example. Additional satellite systems such as planned regional satellite systems Quasi-Zenith Satellite System (QZSS), Indian Regional Navigational Satellite System (IRNSS), and Doppler Orbitography and Radio-positioning Integrated by Satellite (DORIS) are additional examples of SPS with which the above techniques may be used. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "space vehicle" (SV) as referred to herein relates to an object that is capable of transmitting signals to receivers on the Earth's surface. In one particular example, such an SV may comprise a geostationary/geosynchronous satellite. Alternatively, an SV may comprise a satellite traveling in an orbit and moving relative to a stationary position on the Earth. However, these are merely examples of SVs and claimed subject matter is not limited in these respects.

Techniques described herein may also be used to receive and process signals for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
   receiving two or more wireless signals at a receiver at two or more receiver paths;
   downconverting the two or more received wireless signals using two or more separate complex mixers in the two or more receiver paths to generate at least in-phase and quadrature intermediate frequency signals based, at least in part, on two or more oscillating signals having individually selectable frequencies received from one or more local oscillators to enable oscillating signals at different frequencies to be applied to different ones of said separate complex mixers generating said in-phase and quadrature intermediate frequency signals;
   combining the two or more in-phase and quadrature intermediate frequency signals to generate a combined signal comprising an in-phase component and a quadrature component;
   converting the combined signal to a digital signal using a single analog-to-digital converter, the digital signal comprising an in-phase component and a quadrature component; and
   wherein said two or more receiver paths comprise two or more low noise amplifiers, and wherein said in-phase and quadrature intermediate frequency signals are spectrally shifted to different intermediate frequencies by said separate complex mixers.

2. The method of claim 1, wherein said two or more received wireless signals comprise a single wireless signal transmitted from a first satellite positioning system (SPS) and received at two or more antennae associated with said two or more receiver paths.

3. The method of claim 2, wherein said two or more oscillating signals have approximately the same frequency and wherein a first of said two or more oscillating signals is approximately 180° out of phase with a second of said two or more oscillating signals.

4. The method of claim 3, wherein said downconverting further comprises:
   mixing a first wireless signal received at a first of said two or more antennae with the first oscillator signal; and
   mixing a second wireless signal received at a second of said two or more antennae the second oscillator signal.

5. The method of claim 1, wherein said two or more received wireless signals comprise a first wireless signal transmitted from a first global navigation satellite system (GNSS) and a second wireless signal also transmitted from the first GNSS.

6. The method of claim 5, wherein said two or more oscillating signals are selected to have differing frequencies.

7. The method of claim 1, wherein said two or more received wireless signals comprise a first wireless signal transmitted from a first global navigation satellite system (GNSS) and a second wireless signal transmitted from a second GNSS.

8. The method of claim 7, wherein said two or more oscillating signals are selected to have differing frequencies.

9. The method of claim 7, wherein the first wireless signal is transmitted from a Glonass GNSS, and wherein the second wireless signal is transmitted from an satellite positioning system comprising a GPS GNSS and/or a Galileo GNSS.

10. The method of claim 1, wherein said two or more receiver paths receive said two or more wireless signals through two or more antennae, and wherein said two or more receiver paths comprise two or more baseband filters.

11. The method of claim 1, further comprising filtering the combined signal using a combined signal baseband filter, the analog-to-digital converter to receive the combined signal from the combined signal baseband filter.

12. The method of claim 1, further comprising separating the digital signal into a plurality of in-phase components and a plurality of quadrature components using a complex downconversion operation.

13. A mobile station, comprising:
   a receiver comprising two or more radio receiver paths to receive two or more wireless signals;
   two or more separate complex mixers in the two or more receiver paths to downconvert the two or more received wireless signals to generate at least in-phase and quadrature intermediate frequency signals based, at least in part, on two or more oscillating signals having individually selectable frequencies received from one or more local oscillators to enable oscillating signals at different frequencies to be applied to different ones of said separate complex mixers generating said in-phase and quadrature intermediate frequency signals;
   a combiner to combine the two or more in-phase and quadrature intermediate frequency signals to generate a combined signal comprising an in-phase component and a quadrature component;
   an analog-to-digital converter to convert the combined signal to a digital signal using a single analog-to-digital converter, the digital signal comprising an in-phase component and a quadrature component; and
   wherein said two or more receiver paths comprise two or more low noise amplifiers, and wherein said in-phase and quadrature intermediate frequency signals are spectrally shifted to different intermediate frequencies by said separate complex mixers.

14. The mobile station of claim 13, wherein said two or more wireless signals comprise a single wireless signal transmitted from a first satellite positioning system (SPS) and received at two or more antennae associated with said two or more receiver paths.

15. The mobile station of claim 14, wherein said two or more oscillating signals have approximately the same frequency and wherein a first of said two or more oscillating signals is approximately 180° out of phase with a second of said two or more oscillating signals.

16. The mobile station of claim 15, said two or more complex mixers to downconvert the two or more wireless signals by mixing a first wireless signal received at a first of said two or more antennae with the first oscillator signal and mixing a second wireless signal received at a second of said two or more antennae the second oscillator signal.

17. The mobile station of claim 13, wherein said two or more wireless signals comprise a first wireless signal transmitted from a first global navigation satellite system (GNSS) and a second wireless signal also transmitted from the first GNSS.

18. The mobile station of claim 17, wherein said two or more oscillating signals are selected to have differing frequencies.

19. The mobile station of claim 13, wherein said two or more wireless signals comprise a first wireless signal transmitted from a first global navigation satellite system (GNSS) and a second wireless signal transmitted from a second GNSS.

20. The mobile station of claim 19, wherein said two or more oscillating signals are selected to have differing frequencies.

21. The mobile station of claim 19, wherein the first wireless signal is transmitted from a Glonass GNSS, and wherein the second wireless signal is transmitted from a satellite positioning system comprising a GPS GNSS and/or a Galileo GNSS.

22. The mobile station of claim 13, further comprising two or more antennae associated with said two or more receiver paths, said two or more receiver paths to receive said two or more wireless signals through said two or more antennae, and wherein said two or more receiver paths comprise two or more baseband filters.

23. The mobile station of claim 13, wherein said two or more receiver paths comprise two or more low noise amplifiers.

24. The mobile station of claim 13, further comprising a combined signal baseband filter to filter the combined signal, the analog-to-digital converter to receive the combined signal from the combined signal baseband filter.

25. The mobile station of claim 13, further comprising a complex down-converter coupled to the analog-to-digital converter, the complex down-converter to separate the digital signal into a plurality of in-phase components and a plurality of quadrature components using a complex down-conversion operation.

26. An apparatus, comprising:
two or more separate means for receiving two or more wireless signals;
two or more separate means for downconverting the two or more received wireless signals to generate at least in-phase and quadrature phased intermediate frequency signals based, at least in part, on two or more oscillating signals having individually selectable frequencies received from one or more local oscillators to enable oscillating signals at different frequencies to be applied to different ones of said separate complex mixers generating said in-phase and quadrature intermediate frequency signals;
means for combining the two or more in-phase and quadrature intermediate frequency signals to generate a combined signal comprising an in-phase component and a quadrature component;
means for converting the combined signal to a digital signal using a single analog-to-digital converter, the digital signal comprising an in-phase component and a quadrature component; and
wherein said two or more receiver paths comprise two or more low noise amplifiers, and wherein said in-phase and quadrature intermediate frequency signals are spectrally shifted to different intermediate frequencies by said separate complex mixers.

27. The apparatus of claim 26, wherein said two or more wireless signals comprise a single wireless signal transmitted from a first satellite positioning system (SPS) and received at two or more antennae associated with said two or more means for receiving.

28. The apparatus of claim 27, wherein said two or more oscillating signals have approximately the same frequency and wherein a first of said two or more oscillating signals is approximately 180° out of phase with a second of said two or more oscillating signals.

29. The apparatus of claim 28, wherein said two or more means for downconverting further comprises:
means for mixing a first wireless signal received at a first of said two or more antennae with the first oscillator signal; and
means for mixing a second wireless signal received at a second of said two or more antennae the second oscillator signal.

30. The apparatus of claim 26, wherein said two or more wireless signals comprise a first wireless signal transmitted from a first global navigation satellite system (GNSS) and a second wireless signal also transmitted from the first GNSS.

31. The apparatus of claim 30, wherein said two or more oscillating signals are selected to have differing frequencies.

32. The apparatus of claim 26, wherein said two or more wireless signals comprise a first wireless signal transmitted from a first global navigation satellite system (GNSS) and a second wireless signal transmitted from a second GNSS.

33. The apparatus of claim 32, wherein said two or more oscillating signals are selected to have differing frequencies.

34. The apparatus of claim 32, wherein the first wireless signal is transmitted from a Glonass GNSS, and wherein the second wireless signal is transmitted from an satellite positioning system comprising a GPS GNSS and/or a Galileo GNSS.

35. The apparatus of claim 26, wherein said two or more means for receiving receive said two or more wireless signals through two or more antennae, and wherein said two or more means for receiving comprise two or more means for filtering.

36. The apparatus of claim 26, wherein said two or more means for receiving comprise two or more means for low noise amplification of the two or more wireless signals.

37. The apparatus of claim 26, further comprising means for filtering the combined signal, the means for converting the combined signal to a digital signal to receive the combined signal from the means for filtering the combined signal.

38. The apparatus of claim 26, further comprising means for separating the digital signal into a plurality of in-phase components and a plurality of quadrature components.

* * * * *